(12) United States Patent
Frank et al.

(10) Patent No.: US 10,775,515 B2
(45) Date of Patent: Sep. 15, 2020

(54) RADIATION DETECTION APPARATUS HAVING AN ANALYZER WITHIN A HOUSING

(71) Applicant: SAINT-GOBAIN CERAMICS & PLASTICS, INC., Worcester, MA (US)

(72) Inventors: John M. Frank, Akron, OH (US); Artan Duraj, Seven Hills, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/169,535

(22) Filed: Oct. 24, 2018

(65) Prior Publication Data

US 2020/0025952 A1 Jan. 23, 2020

Related U.S. Application Data

(60) Provisional application No. 62/576,623, filed on Oct. 24, 2017.

(51) Int. Cl.
*G01T 1/20* (2006.01)
*G01T 7/00* (2006.01)

(52) U.S. Cl.
CPC .......... *G01T 1/2006* (2013.01); *G01T 1/2004* (2013.01); *G01T 1/2018* (2013.01); *G01T 7/00* (2013.01)

(58) Field of Classification Search
CPC ........ G01T 1/2018; G01T 1/2004; G01T 7/00
See application file for complete search history.

(56) References Cited

U.S. PATENT DOCUMENTS

| 4,514,632 | A | 4/1985 | Barrett |
| 5,070,249 | A | 12/1991 | White |
| 5,796,109 | A | 8/1998 | Frederick et al. |
| 6,194,726 | B1 | 2/2001 | Pi et al. |
| 6,359,282 | B1 | 3/2002 | Sekela |

(Continued)

FOREIGN PATENT DOCUMENTS

| CN | 104688261 A | 6/2015 |
| GB | 2521766 A | 7/2015 |

(Continued)

OTHER PUBLICATIONS

"MPPC module for PET," Hamamatsu, 2016, 9 pages.

(Continued)

*Primary Examiner* — Courtney D Thomas
(74) *Attorney, Agent, or Firm* — Abel Schillinger, LLP; Robert N Young (57) ABSTRACT

A radiation detection apparatus can include a scintillator to emit scintillating light in response to absorbing radiation; a photosensor to generate an electronic pulse in response to receiving the scintillating light; an analyzer to determine a characteristic of the radiation; and a housing that contains the scintillator, the photosensor, and the analyzer, wherein the radiation detection apparatus to is configured to allow functionality be changed without removing the analyzer from the housing. The radiation detection apparatus can be more compact and more rugged as compared to radiation detection apparatuses that include a photomultiplier tube.

20 Claims, 9 Drawing Sheets

(56) References Cited

U.S. PATENT DOCUMENTS

| | | |
|---|---|---|
| 6,909,097 B2 | 6/2005 | Schreiner et al. |
| 7,879,284 B2 | 2/2011 | Martins Loureiro et al. |
| 8,198,597 B2 | 6/2012 | Burr et al. |
| 8,426,823 B2 | 4/2013 | Schulz et al. |
| 8,581,188 B2 | 11/2013 | Barbi et al. |
| 9,658,344 B1 | 5/2017 | Chai et al. |
| 10,036,815 B2 | 7/2018 | Tonami et al. |
| 2011/0017916 A1 | 1/2011 | Schulz et al. |
| 2011/0192981 A1 | 8/2011 | Menge et al. |
| 2012/0043468 A1 | 2/2012 | Flitsch et al. |
| 2013/0168554 A1* | 7/2013 | Howe .................. G01D 11/26 250/358.1 |
| 2014/0091226 A1 | 4/2014 | Duraj et al. |
| 2014/0231657 A1 | 8/2014 | Bolotnikov et al. |
| 2014/0325828 A1 | 11/2014 | Stoller |
| 2014/0339409 A1 | 11/2014 | Stephenson et al. |
| 2015/0234057 A1 | 8/2015 | Brookes et al. |
| 2016/0011126 A1* | 1/2016 | Lingren ................ G01N 23/09 250/251 |
| 2016/0266260 A1 | 9/2016 | Preston |
| 2016/0291171 A1 | 10/2016 | Panniello et al. |

FOREIGN PATENT DOCUMENTS

| | | |
|---|---|---|
| JP | 5446011 B2 | 3/2014 |
| KR | 20160060208 A | 5/2016 |
| WO | 2015172026 A1 | 11/2015 |
| WO | 2016123231 A1 | 8/2016 |

OTHER PUBLICATIONS

International Search Report and Written Opinion for PCT/US2018/057337, dated Jan. 31, 2019, 12 pages.

International Search Report and Written Opinion for PCT/US2019/062858, dated Mar. 20, 2020, 14 pages.

International Search Report and Written Opinion for PCT/US2018/057333, dated Dec. 12, 2019, 13 pages.

\* cited by examiner

RADIATION DETECTION APPARATUS HAVING AN ANALYZER WITHIN A HOUSING

CROSS-REFERENCE TO RELATED APPLICATION

This application claims priority under 35 U.S.C § 119(e) to U.S. Provisional Application No. 62/576,623, entitled "RADIATION DETECTION APPARATUS HAVING AN ANALYZER WITHIN A HOUSING," by John M. Frank et al., filed Oct. 24, 2017, which is assigned to the current assignee hereof and is incorporated herein by reference in its entirety.

FIELD OF THE DISCLOSURE

The present disclosure is directed to radiation detection apparatuses having analyzers within housings.

RELATED ART

A radiation detection apparatus can include a sealed housing having components therein. The functions that the radiation detection apparatus can performed may be determined by the components. To change the functionality, the housing may be opened and components replaced. Opening the housing may be difficult as the housing may be sealed or may be difficult to access (e.g., in a well hole or located deep within complicated equipment). Further improvements in radiation detection apparatuses are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The term "compound semiconductor" is intended to mean a semiconductor material that includes at least two different elements. Examples include SiC, SiGe, GaN, InP, $Al_xGa_{(1-x)}N$ where $0<x<1$, CdTe, and the like. A III-V semiconductor material is intended to mean a semiconductor material that includes at least one trivalent metal element and at least one Group 15 element. A III-N semiconductor material is intended to mean a semiconductor material that includes at least one trivalent metal element and nitrogen. A Group 13-Group 15 semiconductor material is intended to mean a semiconductor material that includes at least one Group 13 element and at least one Group 15 element. A II-VI semiconductor material is intended to mean a semiconductor material that includes at least one divalent metal element and at least one Group 16 element.

The term "avalanche photodiode" refers to a single photodiode having a light-receiving area of least 1 $mm^2$ and is operated in a proportional mode.

The term "SiPM" is intended to mean a photomultiplier that includes a plurality of photodiodes, wherein each of the photodiodes have a cell size less than 1 $mm^2$, and the photodiodes are operated in Geiger mode. The semiconductor material for the diodes in the SiPM can include silicon, a compound semiconductor, or another semiconductor material.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

The use of the word "about", "approximately", or "substantially" is intended to mean that a value of a parameter is close to a stated value or position. However, minor differences may prevent the values or positions from being exactly as stated. Thus, differences of up to ten percent (10%) (and up to twenty percent (20%) for semiconductor doping concentrations) for the value are reasonable differences from the ideal goal of exactly as described.

Group numbers corresponding to columns within the Periodic Table of Elements based on the IUPAC Periodic Table of Elements, version dated Nov. 28, 2016.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation, radiation detection and ranging arts.

A radiation detection apparatus can be configured such that the functionality of the apparatus can be changed without having to remove an analyzer from a housing in which the analyzer is contained. The functionality can be changed by activating or deactivating a function including counting radiation events, discriminating between different types of radiation (e.g., discriminating between gamma radiation and neutrons), identification of an isotope corresponding to the radiation, provide gain compensation for the photosensor, provide information regarding adjustment for light output of the scintillator as a function of temperature, another suitable function, or any combination thereof In an aspect, the radiation detection apparatus can include a scintillator to emit scintillating light in response to absorbing radiation; a photosensor to generate an electronic pulse in response to receiving the scintillating light; an analyzer to determine a characteristic of the radiation; and a housing that contains the scintillator, the photosensor, and the analyzer, wherein the radiation detection apparatus to is configured to allow functionality be changed without removing the analyzer from the housing.

In an embodiment, the radiation detection apparatus can further include an interface board coupled to the photosensor and the analyzer. In another embodiment, the photosensor can include a semiconductor-based photomultiplier. As compared to a radiation detection apparatus with a PMT, a radiation detection apparatus with the semiconductor-based photomultiplier can be made more compact and is more rugged. The semiconductor-based photomultiplier allows power to be provided by a cable connected to the radiation detection apparatus, and the interface board can provide sufficient power to operate the semiconductor-based photomultiplier. Attention is directed to the figures and non-limiting embodiments.

Figure 1:
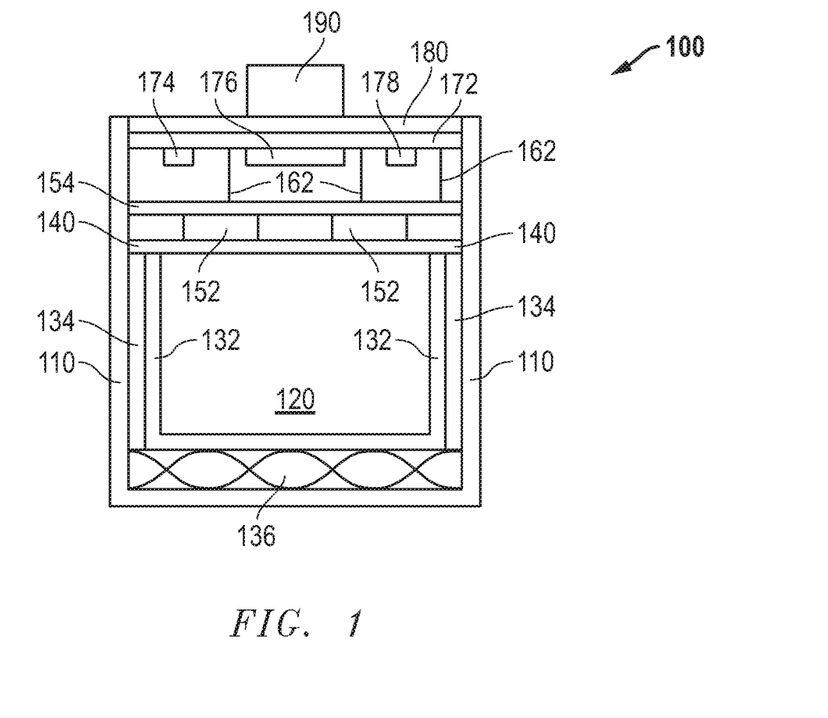
FIG. 1 includes an illustration of a cross-sectional view of a radiation detection apparatus in accordance with an embodiment.

FIG. 1 illustrates an embodiment of a radiation detection apparatus 100. The radiation detection apparatus 100 can be a medical imaging apparatus, a well logging apparatus, a security inspection apparatus, for military applications, or the like. The radiation detection apparatus 100 includes a housing 110 that includes components therein. The housing may be removably sealed or hermetically sealed. In a particular embodiment, the housing 110 can be sealed in accordance with IP Code rating of IP67, wherein the IP Code is International Electrotechnical Commission standard 60529, Edition 2.2 (2013).

The housing 110 contains a scintillator 120 that can include a material that emits scintillating light in response to absorbing radiation, such as gamma rays, ionized particles, or the like. An exemplary non-limiting material for the scintillator 120 includes an alkali halide, a rare earth halide, an elpasolite, a rare-earth containing silicate, perovskite oxide, or the like. When the housing 110 is sealed, materials that are hygroscopic or adversely interact with ambient conditions adjacent to the housing 110 can be protected. The scintillator 120 is surrounded by a reflector 132. The reflector 132 can laterally surround the scintillator 120 or may surround the scintillator on all sides except for a side that faces a photosensor 152. The reflector 132 can include specular reflector, a diffuse reflector, or both. One or more resilient members can help to keep the scintillator 120 in place within the housing 110. In the embodiment as illustrated, an elastomeric material 134 can surround the reflector 132, and a spring 136 may be disposed between the scintillator 120 and the housing 110. Although not illustrated, a plate may be used between the spring 136 and the scintillator 120 to distribute more uniformly pressure along the surface of the scintillator 120.

A semiconductor-based photomultiplier can be optically coupled to the scintillator 120 via an optical coupler 140. The semiconductor-based photomultiplier can include a SiPM or an avalanche photodiode. In one embodiment, the semiconductor-based photomultiplier can include one or more SiPMs 152. As seen in the embodiment as illustrated, SiPMs 152 can be mounted on a printed wiring board 154. In one embodiment, the SiPMs 152 can be between the printed wiring board 154 and the optical coupler 140. In one embodiment, the optical coupler 140 can be silica. In another embodiment, the SiPMs 152 can be coupled to the optical coupler 140 using an epoxy or rubber silicone. An electronic pulse from the SiPMs 152 can be routed through the printed wiring board 154 and electrical connectors 162 to an interface board 172. The electrical connectors 162 can be wires (illustrated), solder balls, or the like.

Figure 2:
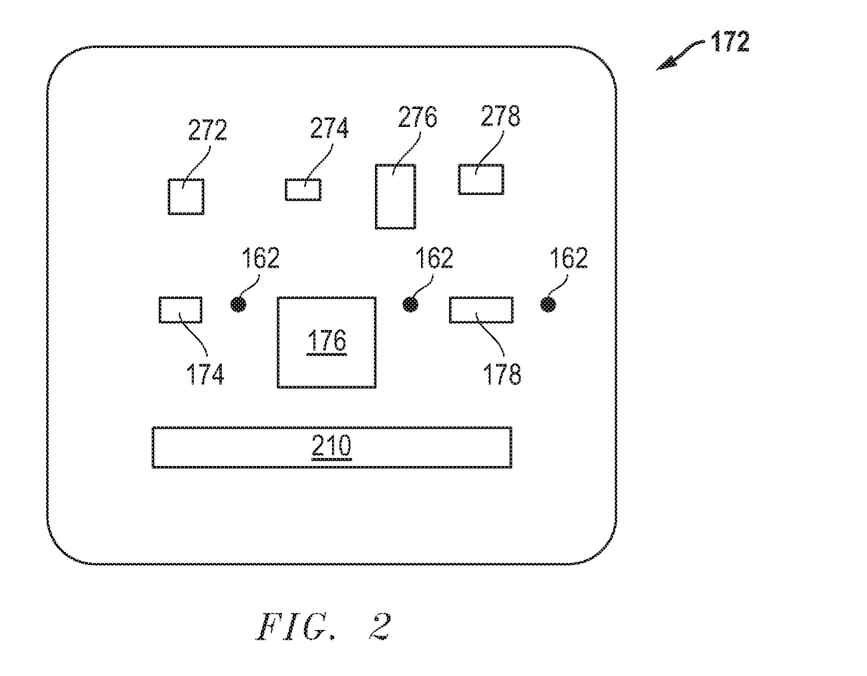
FIG. 2 includes an illustration of a bottom surface of an interface board as illustrated in FIG. 1.
Figure 11:
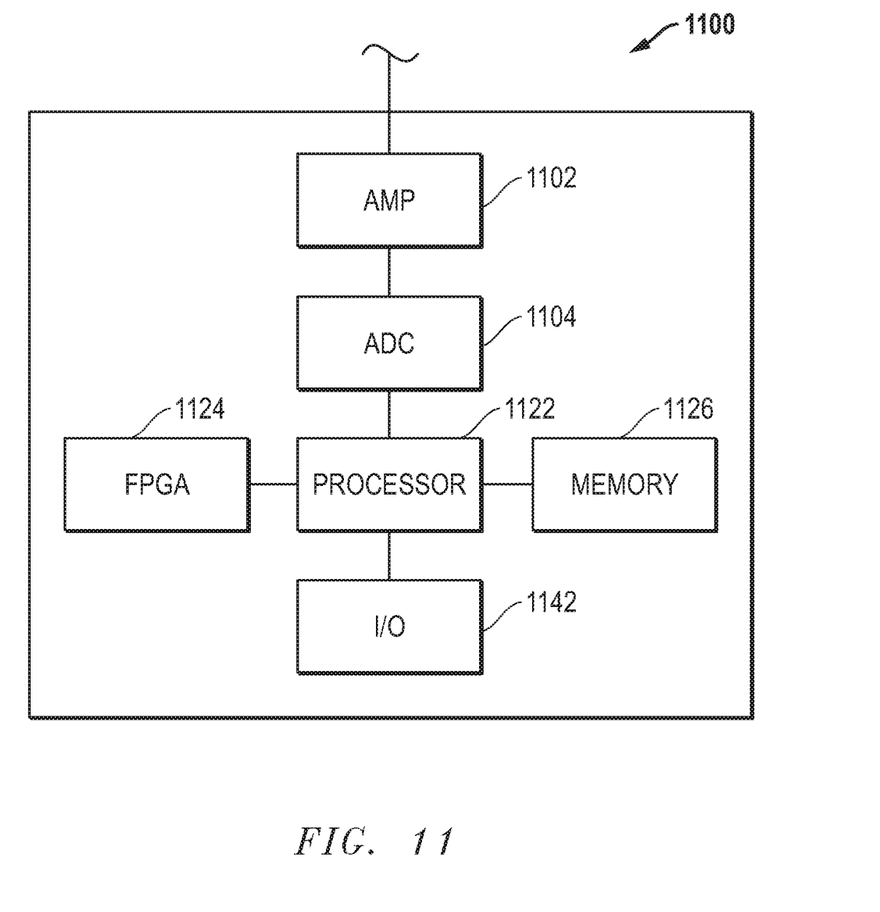
FIG. 11 includes a depiction of a control module that can be used in the apparatus of FIG. 1.

The interface board 172 can include electronic components 174, 176, and 178. FIG. 2 includes a view of the bottom surface of the interface board 172 that further includes additional electronic components 272, 274, 276, and 278 and a charge storage element 210, such as a battery, a capacitor, or the like. One of the electronic components can include a universal asynchronous receiver/transmitter. The functions of the electronic components are described with respect to a control module as illustrated in FIG. 11 and are addressed later in this specification. In another embodiment, some or all of the components illustrated on the bottom side of the interface board may be on the top side of the interface board 172.

Figure 3:
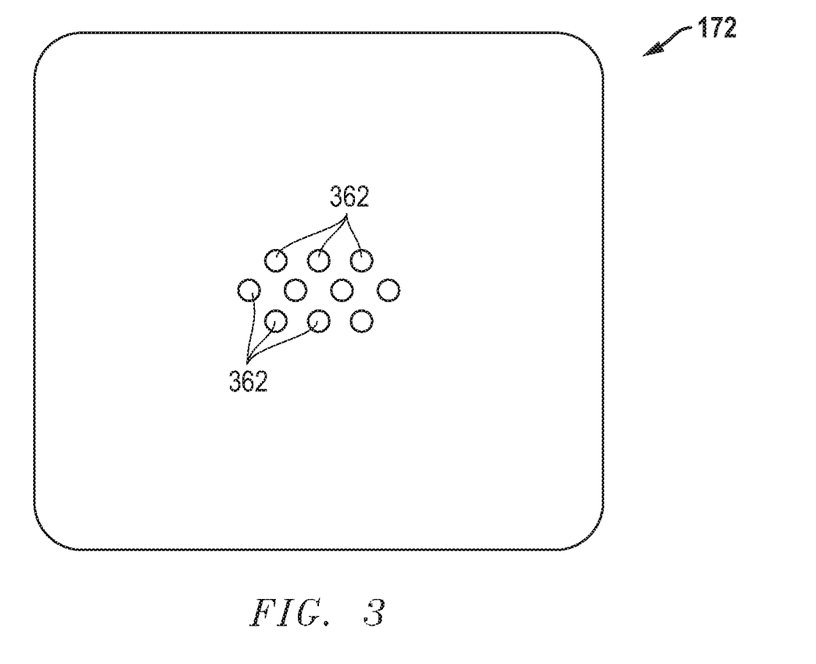
FIG. 3 includes an illustration of a top surface of the interface board as illustrated in FIG. 1.

FIG. 3 includes a view of the top surface of the interface board 172. Electrical connectors 362 can extend through a lid 180 and into a connector section 190 that is configured to receive an external connector. The number and arrangement of connectors 362 and design of the connector section 190 can depend on the type of external connector used.

Figure 4:
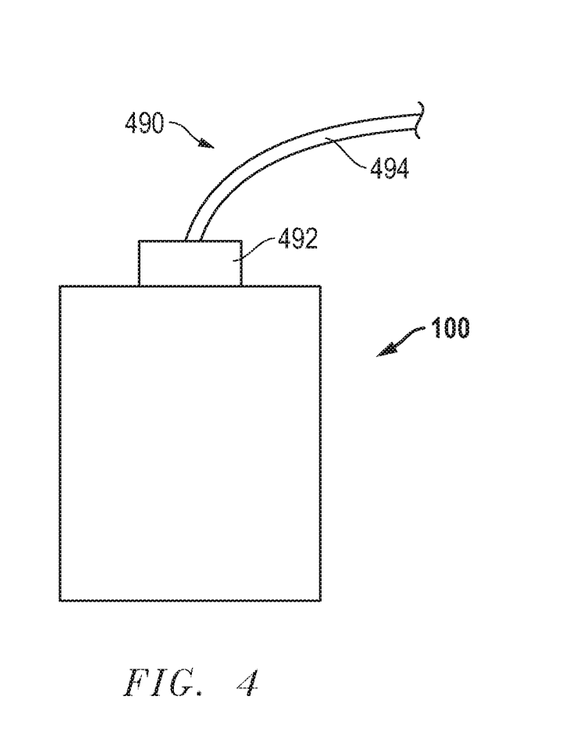
FIG. 4 includes an illustration of a side view of the radiation detection apparatus of FIG. 1 and an external connector coupled to the apparatus.

FIG. 4 includes a side view of the radiation detector apparatus 100 and an external connector 490 connected to the radiation apparatus. In the embodiment as illustrated, the connector 490 can include a sealing boot 492 and a cable 494. The configuration allows for an IP67 sealing of the radiation detection apparatus 100 to the external connector 490.

Figure 5:
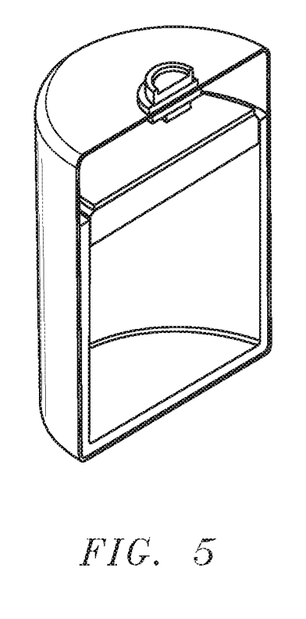
FIG. 5 includes an illustration of a perspective cutaway view of a portion of the apparatus of FIG. 1
Figure 6:
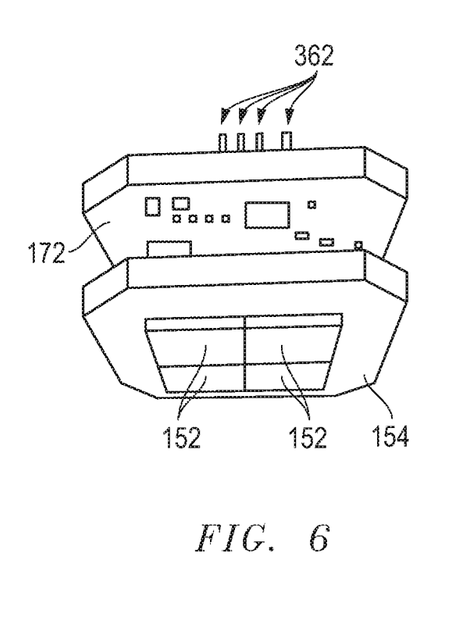
FIG. 6 includes an illustration of a perspective view of portions of a wiring board and an interface board of the apparatus of FIG. 1.
Figure 7:
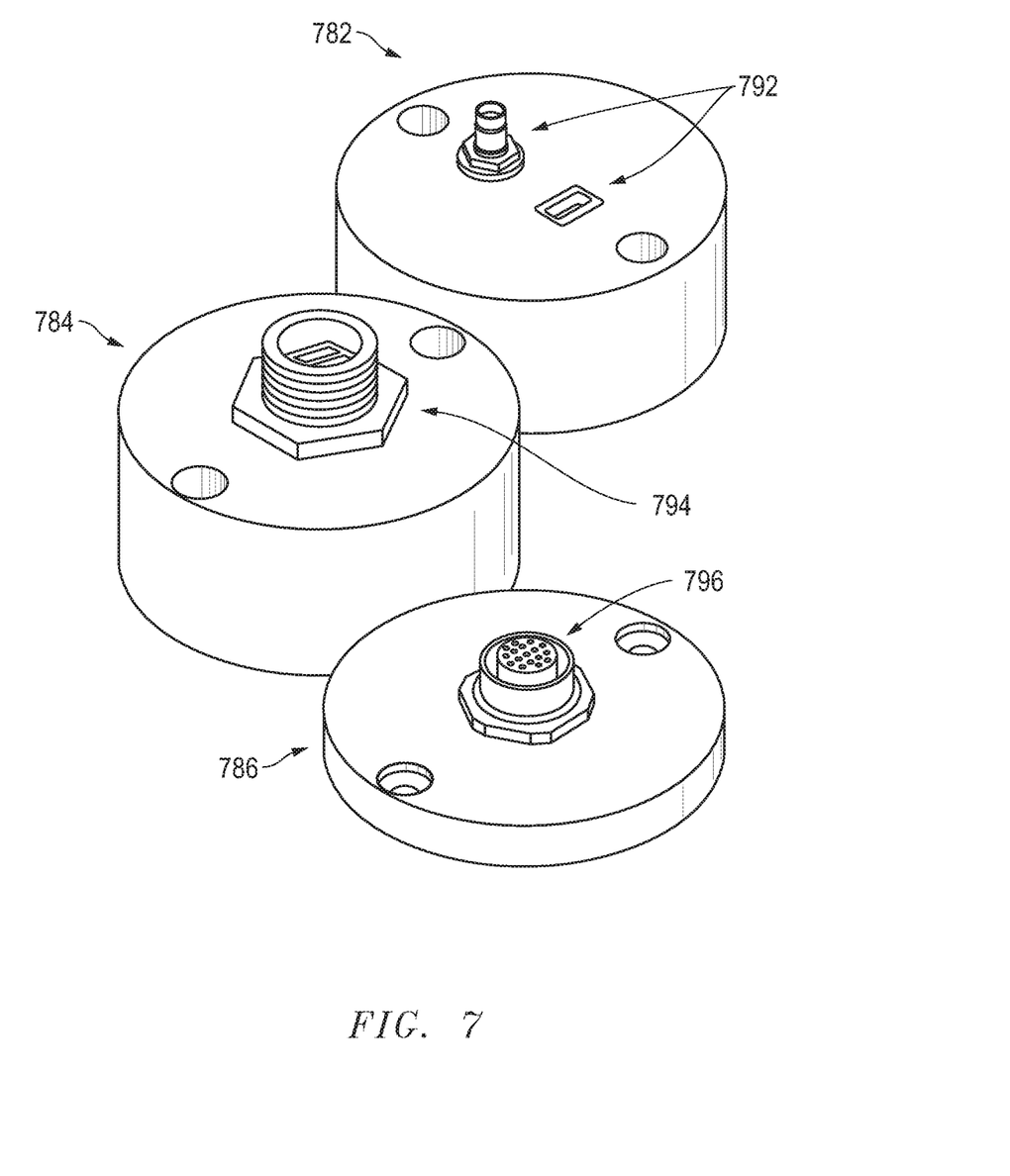
FIG. 7 includes an illustration of perspective view of different lids that can be used with the apparatus of FIG. 1.

FIGS. 5 to 7 include further illustrations of portions of the radiation detection apparatus 100. FIG. 5 includes a perspective cutaway view of a portion of the radiation detection apparatus. FIG. 5 includes the all of the features as illustrated in FIG. 1 except the scintillator 120, the reflector 132, resilient members, and optical coupler 140 are removed. FIG. 6 illustrates the printed wiring board 154 and interface board 172 separated from each other. Four SiPMs are illustrated, although in another embodiment, more or fewer SiPMs may be used. Electronic components on the interface board 172 are illustrated but not individually labeled with reference numbers. FIG. 7 includes perspective views of lids 782, 784, and 786. The lid 782 has two external connectors 792, one of which is a coaxial cable connector and the other is a mini Universal Serial Bus connector. In another embodiment, more or different connectors can be used. If needed or desired surface mount technology may be used for a connection. The external connector can provide power to the radiation detection apparatus 100, and at least some of the power can be transmitted via the interface board 172 to power the photosensor, such as the semiconductor-based photomultiplier, and even more particularly the SiPMs 152. The radiation detection apparatus 100 can include modular components such as the SIPMs 152 on the wiring board 154, the interface board 172, and the lid.

Figure 8:
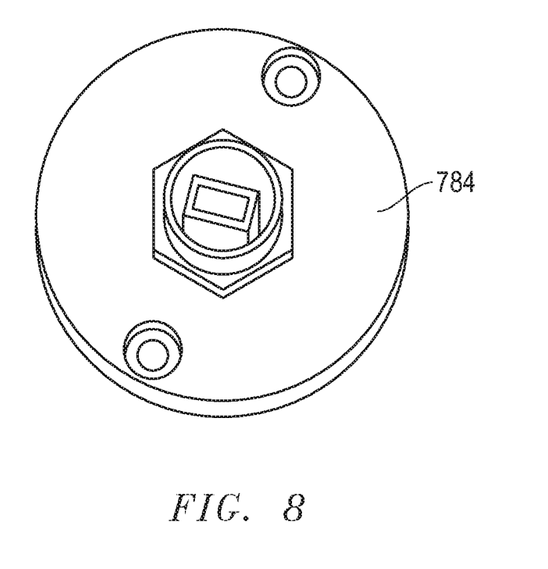
FIGS. 8 and 9 include illustrations of top and bottom views, respectively, of one of the lids in FIG. 7.
Figure 9:
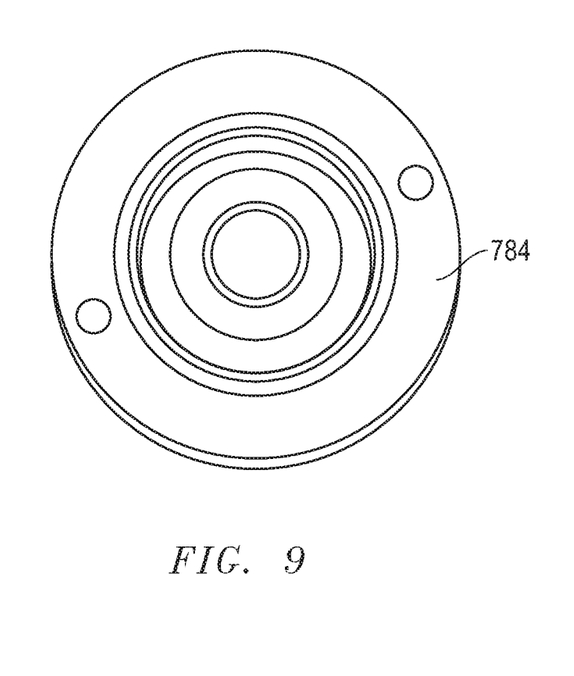
Figure 10:
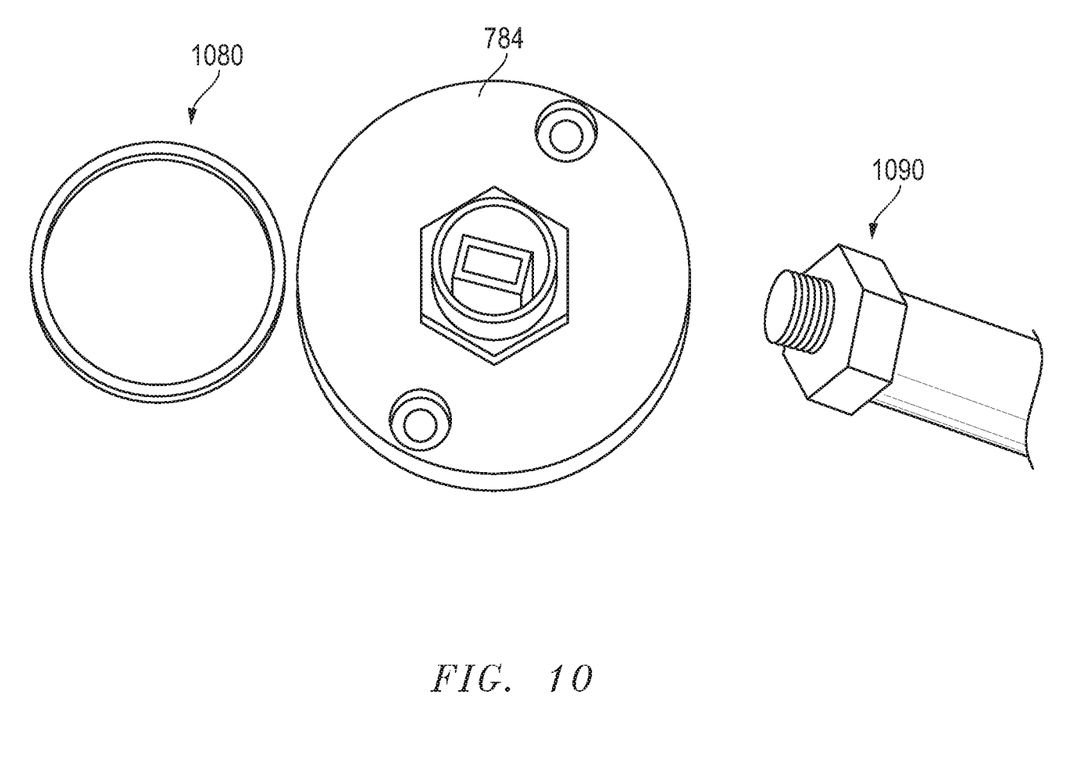
FIG. 10 includes an illustration of the lid in FIGS. 8 and 9 and an electrical connector and an O-ring.

FIGS. 8 to 10 include illustrations regarding the lid 784. FIG. 8 includes a top view, and FIG. 9 includes a bottom view. FIG. 10 illustrates the lid 784, a connector 1090 that can be used with the lid 784, and an O-ring 1080 that can be used to help seal the lid 784 to the housing 110 (not illustrated in FIG. 10).

The electronic components on the interface board 172 can be configured to act as a control module 1100 as illustrated in FIG. 11. The semiconductor-based photomultiplier is coupled to an amplifier 1102 within the control module 1100. In an embodiment, the amplifier 1102 can be a high fidelity amplifier. The amplifier 1102 can amplify the electronic pulse, and the amplified electronic pulse can be converted to a digital signal at an analog-to-digital converter ("ADC") 1104 that can be received by the processor 1122. The processor 1122 can be coupled to a programmable/reprogrammable processing module ("PRPM"), such as a field programmable gate array ("FPGA") 1124 or application-specific integrated circuit ("ASIC"), a memory 1126, and an input/output ("I/O") module 1142. The couplings may be unidirectional or bidirectional. In another embodiment, more, fewer, or different components can be used in the control module 1100. For example, functions provided by the FPGA 1124 may be performed by the processor 1122, and thus, the FPGA 1124 is not required. The FPGA 1124 can act on information faster than the processor 1122.

The control module 1100 can include an analyzer and perform one or more different functions. The function can include counting radiation events, discriminating between different types of radiation, identification of an isotope corresponding to the radiation, provide gain compensation for the photosensor, provide information regarding adjustment for light output of the scintillator as a function of temperature, performing another suitable function, or any combination thereof. The analyzer may be a multichannel analyzer. The analyzer may include the processor 1122, the FPGA 1124, or a combination thereof. Referring to FIGS. 1 and 11, the interface board 172 couples the photosensor, such as the SiPMs 152, and the analyzer to each other. In one embodiment, the interface board 172 is removable coupled to the wiring board 154.

Figure 12:
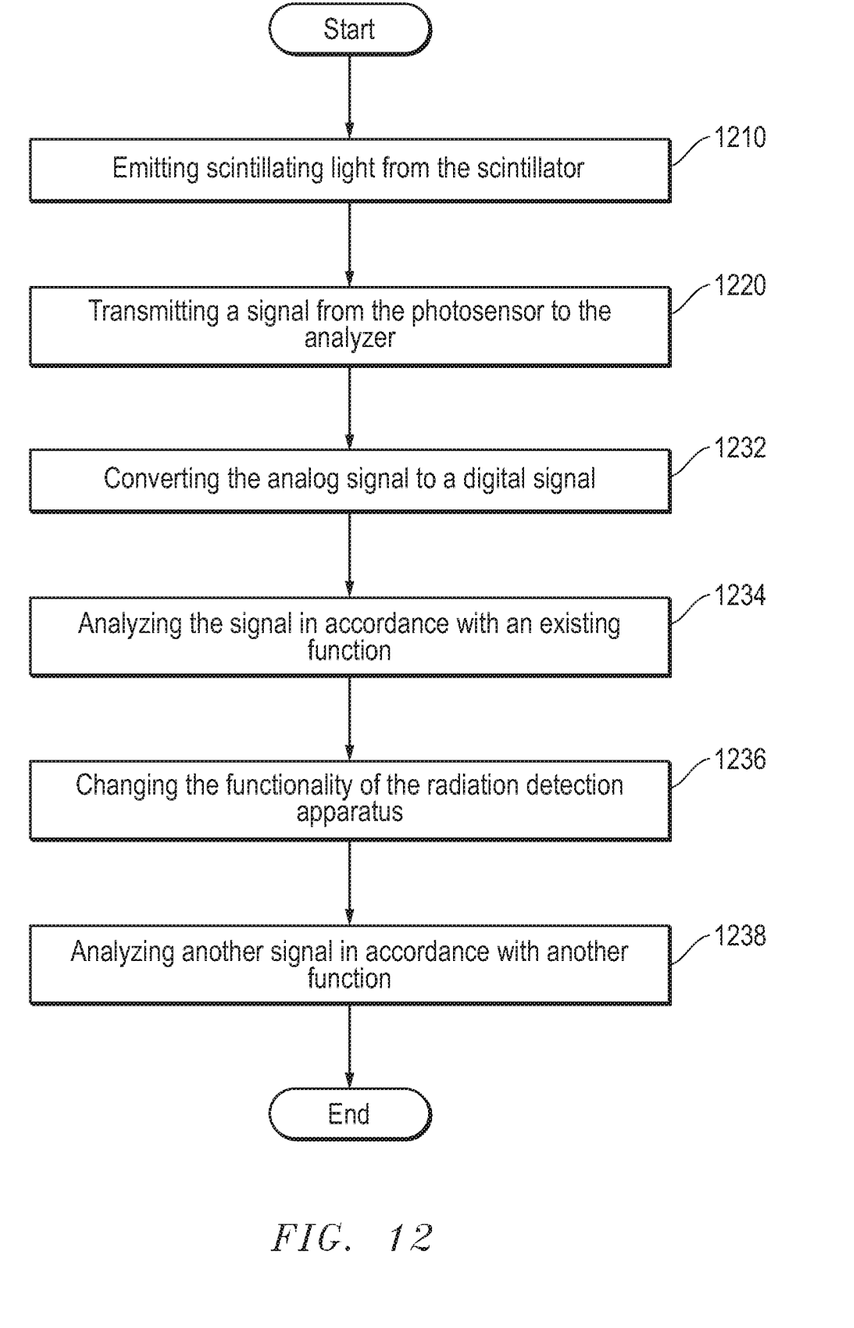
FIG. 12 includes a flow diagram of a method of using the apparatus of FIG. 1.

FIG. 12 includes a flow chart for using the radiation detection apparatus 100 in accordance with an exemplary embodiment. The method is described in conjunction with FIGS. 1 and 11. If an external connector has not been connected to the radiation detection apparatus 100, an external connector can be connected to the radiation detection apparatus 100 before performing the remainder of the method as described below.

A radiation source can be placed near the radiation detection apparatus 100. Radiation from the radiation source can be absorbed by the scintillator 120. The method can include emitting scintillating layer from the scintillator 120, at block 1210. The scintillating light can be emitted in response to absorbing the radiation. The scintillating light can be received by the semiconductor-based photomultiplier that can generate an electronic pulse in response to receiving the scintillating light. In an embodiment, scintillating light from the scintillator passes through the optical coupler 140 to the SiPMs 152. The electronic pulse is an example of an analog signal. The method can further include transmitting the signal from the photosensor to the analyzer, at block 1220. The electronic pulse from the SiPMs 152 in FIG. 1 can be received by the amplifier 1102 and amplified to produce an amplified signal.

If needed or desired, the method can include converting the analog signal to a digital signal, at block 1232. In particular, the amplified signal can be converted from an analog signal to a digital signal at ADC 1104. The conversion of the signal is optional, as the analyzer may perform analysis using an analog signal. The signal, whether analog or digital, can be received by the processor 1122.

The method can further include analyzing the signal in accordance with an existing function, at block 1234. The function can include any of the previously described function with respect to the control module 1100. The analysis can be used to determine a characteristic of the radiation absorbed by the scintillator 120. The analysis can be performed by the processor 1122 in conjunction with instructions that can be stored in memory 1126, performed by the FPGA 1124, or a combination of the processor 1122 and FPGA 1124.

The method can also include changing the functionality of the radiation detection apparatus 100, at block 1100. Changing the functionality can include deactivating a function or activating a function. For example, the existing function may be deactivated, a new function can be added, or a combination thereof. In a particular embodiment, the radiation detection apparatus 100 may have been sold with many functions that include a particular function that can be used for a trial period. If a fee is not paid and time has expired, some of the functions can be deactivated. In another particular embodiment, the radiation detection apparatus 100 can provide at least one function but does not include another function. At a later time, the user can pay an activation fee, and the other function may then be activated. An advantage of the FPGA 1124 is that it can be erased and information corresponding to a function can be written into the FPGA 1124. Alternatively, a file with instructions corresponding to a particular function can be deleted from the memory 1126, and a new file with instructions corresponding to another function can be stored in the memory 1126. In one embodiment, instructions can be sent to the control module 1100 on the interface board 172 through the cable 494 to turn activate or deactivate functions of the radiation detection apparatus 100. In another embodiment, the interface board 172 may be removed and replaced with a different interface board 172 containing different functions. Thus, functionality of the radiation detection apparatus 100 can be changed without removing the analyzer from the housing 110. This advantage can be helpful particularly when the housing 110 is a sealed housing because the seal does not have to be broken and the housing resealed.

More radiation may be absorbed by the scintillator 120 that emits scintillating light that is received by the photosensor that generates another electronic pulse. The method can include analyzing another signal in accordance with another function, at block 1238. The electronic pulse can be processed similar to the manner as previously described to provide the other signal. This other signal can be analyzed by the processor 1122, the FPGA 1124, or both. The function can be any of the functions as previously described to determine a characteristic of the radiation. The analysis can be for a new function that has recently been added since the prior analysis in block 1234.

Figure 13:
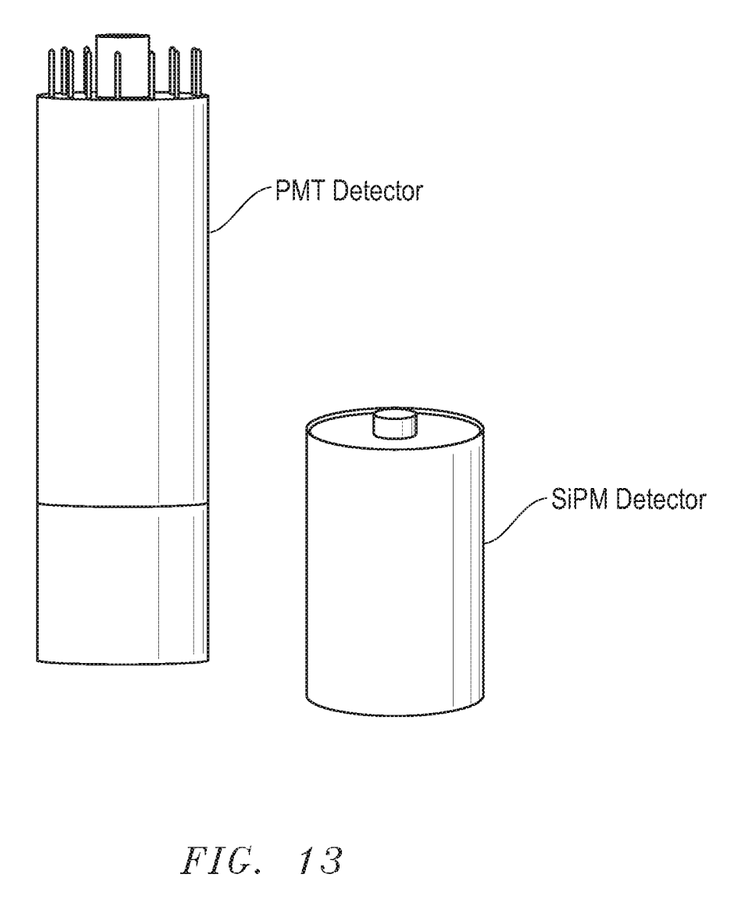
FIG. 13 includes illustrations of side view of radiation detection apparatuses to show length differences between the apparatuses.

Embodiments of the radiation detection apparatus having the semiconductor-based photomultiplier can allow for a significantly smaller size as compared to a radiation detection apparatus with a photomultiplier tube ("PMT"). FIG. 13 includes side views of two different radiation detection apparatus: a PMT detector that includes a PMT, and a SiPM detector that includes semiconductor-based photomultipliers, and SiPMs in a particular embodiment. For each detector illustrated, the scintillator, the photosensor, the analyzer and the interface board are oriented along a length of the housing. For the SiPM detector, the combination of the photosensor, the analyzer and the interface board makes up at most 50%, at most 40%, or at most 25% of the length of the housing. For the PMT, the combination of the photosensor, the analyzer and the interface board makes up over 65% of the length of the housing.

Further, PMTs require substantially more voltage than semiconductor-based photomultipliers. Thus, an analyzer is not located in the PMT detector. Further, the power required for the PMT may exceed the voltage that the interface board 172 supports. Thus, the PMT detector is not only larger, but it also does not provide the functionality as previously described with respect to the radiation detector apparatuses previously described. Still further, the radiation detector apparatuses described herein is more rugged and can withstand more abuse or demanding conditions are compared to the PMT detector.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A radiation detection apparatus comprising: a scintillator to emit scintillating light in response to absorbing radiation; a photosensor to generate an electronic pulse in response to receiving the scintillating light; an analyzer to determine a characteristic of the radiation; and a housing that contains the scintillator, the photosensor, and the analyzer, wherein the radiation detection apparatus to is configured to allow functionality be changed without removing the analyzer from the housing.

Embodiment 2. The radiation detection apparatus of Embodiment 1, wherein the functionality includes counting radiation events, discriminating between different types of radiation, identification of an isotope corresponding to the radiation, provide gain compensation for the photosensor, provide information regarding adjustment for light output of the scintillator as a function of temperature, or any combination thereof.

Embodiment 3. The radiation detection apparatus of Embodiment 1 or 2, further comprising an interface board coupled to the photosensor and the analyzer.

Embodiment 4. A method of using radiation detection apparatus comprising: providing housing containing a scintillator, a photosensor, and an analyzer, wherein: the scintillator is configured to emit scintillating light in response to absorbing radiation; the photosensor is configured to generate an electronic pulse in response to receiving the scintillating light; the analyzer is configured to determine a characteristic of the radiation; and changing functionality of the radiation detection apparatus without removing the analyzer from the housing.

Embodiment 5. The method of Embodiment 4, changing functionality comprises to activating or deactivating a function including counting radiation events, discriminating between different types of radiation, identification of an isotope corresponding to the radiation, provide gain compensation for the photosensor, provide information regarding adjustment for light output of the scintillator as a function of temperature, or any combination thereof.

Embodiment 6. The method of Embodiment 4 or 5, further comprising analyzing a signal corresponding to the radiation.

Embodiment 7. The method of Embodiment 6, wherein analyzing the signal in accordance with a function after changing the functionality, wherein changing the functionality is performed to activate the function.

Embodiment 8. The method of Embodiment 6, further comprising analyzing the signal corresponding to the radiation in accordance with a function before changing the functionality, wherein changing the functionality is performed to deactivate the function.

Embodiment 9. The method of any one of Embodiments 4 to 8, wherein providing the housing comprising providing a sealed housing.

Embodiment 10. The method of Embodiment 9, wherein changing the functionality is performed without breaking a seal of the sealed housing.

Embodiment 11. The method of any one of Embodiments 3 to 10, further comprising emitting scintillating light from the scintillator in response to absorbing radiation, and transmitting a signal from the photosensor to the analyzer.

Embodiment 12. The method of Embodiment 11, wherein the signal from the photosensor is an analog signal.

Embodiment 13. The method of Embodiment 12, further comprising converting the analog signal to a digital signal.

Embodiment 14. The method of any one of Embodiments 4 to 13, further comprising connecting an external connector to the radiation detection apparatus.

Embodiment 15. The method of Embodiment 14, wherein connecting an external connector comprises connecting a coaxial cable connector, a Universal Serial Bus connector, a surface mount technology connector to the radiation detection apparatus.

Embodiment 16. The method of Embodiment 14 or 15, wherein connecting an external connector comprising connecting an external connector to provide an IP Code rating of IP67, wherein the IP Code is International Electrotechnical Commission standard 60529, Edition 2.2 (2013).

Embodiment 17. The method of any one of Embodiments 4 to 16, wherein providing a housing comprises providing a housing further comprising an interface board coupled to the photosensor and the analyzer.

Embodiment 18. The method of Embodiment 17, further comprising transmitting power from an external source to the photosensor via the interface board.

Embodiment 19. The radiation detection apparatus or the method of any one of Embodiments 1 or 18, wherein the analyzer includes a multichannel analyzer.

Embodiment 20. The radiation detection apparatus or the method of any one of Embodiments 1 to 19, wherein the interface board further includes a universal asynchronous receiver/transmitter.

Embodiment 21. The radiation detection apparatus or the method of any one of Embodiments 1 to 14 and 17 to 20, wherein the housing further comprises an external connector including a coaxial cable connector, a Universal Serial Bus connector, or a surface mount technology connector.

Embodiment 22. The radiation detection apparatus or the method of Embodiment 21, wherein the external connector allows for an IP Code rating of IP67, wherein the IP Code is International Electrotechnical Commission standard 60529, Edition 2.2 (2013).

Embodiment 23. The radiation detection apparatus or the method of any one of Embodiments 3 and 17 to 22, wherein the interface board is further configured to provide power to the photosensor.

Embodiment 24. The radiation detection apparatus or the method of any one of Embodiments 1 to 23, wherein the photosensor is a semiconductor-based photomultiplier.

Embodiment 25. The radiation detection apparatus or the method of Embodiment 24, wherein the semiconductor-based photomultiplier is a SiPM.

Embodiment 26. The radiation detection apparatus or the method of Embodiment 24, wherein the semiconductor-based photomultiplier is an avalanche photodiode.

Embodiment 27. The radiation detection apparatus or the method of any one of Embodiments 3 and 17 to 26, wherein the photosensor is mounted to a wiring board disposed between the scintillator and the interface board.

Embodiment 28. The radiation detection apparatus or the method of any one of Embodiments 3 and 17 to 27, wherein the scintillator, the photosensor, the analyzer and the interface board are oriented along a length of the housing, wherein a combination of the photosensor, the analyzer and the interface board makes up at most 50%, at most 40%, or at most 25% of the length of the housing.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and apparatuses that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection apparatus comprising:
a scintillator to emit scintillating light in response to absorbing radiation;
a photosensor to generate an electronic pulse in response to receiving the scintillating light;
an analyzer in an interface board to determine a characteristic of the radiation; and
a housing that contains the scintillator, the photosensor, and the analyzer,
wherein the radiation detection apparatus provides for changing a first function and changing a second function different from the first function without removing the interface board from the housing.

2. The radiation detection apparatus of claim 1, wherein the first functionality includes counting radiation events, discriminating between different types of radiation, identification of an isotope corresponding to the radiation, provide gain compensation for the photosensor, provide information regarding adjustment for light output of the scintillator as a function of temperature, or any combination thereof.

3. The radiation detection apparatus of claim 1, wherein the interface board is removably coupled to the photosensor.

4. The radiation detection apparatus of claim 1, wherein the photosensor is a semiconductor-based photomultiplier.

5. A method of using radiation detection apparatus comprising:
providing housing containing a scintillator, a photosensor, and an analyzer in an interface board, wherein:
the scintillator is configured to emit scintillating light in response to absorbing radiation;
the photosensor is configured to generate an electronic pulse in response to receiving the scintillating light;
the analyzer is configured to determine a characteristic of the radiation; and
changing a first function and changing a second function different from the first function of the radiation detection apparatus without removing the interface board from the housing.

6. The method of claim 5, wherein the first function comprises counting radiation events, discriminating between different types of radiation, identification of an isotope corresponding to the radiation, provide gain compensation for the photosensor, provide information regarding adjustment for light output of the scintillator as a function of temperature, or any combination thereof.

7. The method of claim 5, further comprising analyzing a signal corresponding to the radiation.

8. The method of claim 5, wherein analyzing the signal in accordance with a function after changing the functionality, wherein changing the functionality is performed to activate the function.

9. The method of claim 7, further comprising analyzing the signal corresponding to the radiation in accordance with a function before changing the functionality, wherein changing the functionality is performed to deactivate the function.

10. The method of claim 5, wherein providing the housing comprising providing a sealed housing.

11. The method of claim 10, wherein changing the functionality is performed without breaking a seal of the sealed housing.

12. The method of claim 5, further comprising:
emitting scintillating light from the scintillator in response to absorbing radiation; and
transmitting a signal from the photosensor to the analyzer.

13. The method of claim 12, wherein the signal from the photosensor is an analog signal.

14. The method of claim 13, further comprising converting the analog signal to a digital signal.

15. The method of claim 5, further comprising connecting an external connector to the radiation detection apparatus.

16. The method of claim 15, wherein connecting an external connector comprises connecting a coaxial cable connector, a Universal Serial Bus connector, a surface mount technology connector to the radiation detection apparatus.

17. The method of claim 15, wherein connecting an external connector comprising connecting an external connector to provide an IP Code rating of IP67, wherein the IP Code is International Electrotechnical Commission standard 60529, Edition 2.2 (2013).

18. The method of claim 5, wherein the photosensor is mounted to a wiring board disposed between the scintillator and the interface board.

19. The method of claim 5, wherein the photosensor is a semiconductor-based photomultiplier.

20. The method of claim 5, wherein the interface board further includes a universal asynchronous receiver/transmitter.

\* \* \* \* \*